United States Patent [19]

Komazawa et al.

[11] Patent Number: 4,540,773

[45] Date of Patent: Sep. 10, 1985

[54] METHOD OF PRODUCING AN IMPROVED POLYACETAL POLYMER

[75] Inventors: Hiroyasu Komazawa; Hiroshi Hotta; Hiroshi Nakatsuji, all of Fuji; Kiyoshi Yoko, Fujinomiya; Seiichi Higashiyama, Fuji; Tuneyasu Nakashima, Kawasaki; Noboru Gotoh, Fujinomiya, all of Japan

[73] Assignee: Polyplastics Company, Ltd., Osaka, Japan

[21] Appl. No.: 649,452

[22] Filed: Sep. 11, 1984

[51] Int. Cl.³ ............................................. C08G 2/28
[52] U.S. Cl. ................................................... 528/480
[58] Field of Search ............. 528/230, 480, 487, 488, 528/489, 490, 491, 492, 499

[56] References Cited

U.S. PATENT DOCUMENTS

| 3,337,504 | 8/1967 | Fisher | 525/414 |
| 4,458,064 | 7/1984 | Chatterjee | 528/501 |
| 3,210,322 | 10/5/65 | Polly et al | 260 |
| 3,733,301 | 5/15/73 | Modan | 260 |

FOREIGN PATENT DOCUMENTS 1383798 9/4/63 France.

*Primary Examiner*—Lucille M. Phynes
*Attorney, Agent, or Firm*—Robert M. Shaw

[57] ABSTRACT

A crude polyacetal polymer obtained by polymerization or copolymerization and having as a principal component thereof connected oxymethylene radicals in a main chain is treated in a non-soluble liquid medium at temperatures higher than 80° C. but lower than the melting point of the polymer and at heterogeneous equilibrium, moving the crude polymer and the non-soluble medium in opposite directions relative to each other.

5 Claims, No Drawings

METHOD OF PRODUCING AN IMPROVED POLYACETAL POLYMER

The present invention relates to an improved method for after-treatment of a crude polyacetal polymer for the production of a polyacetal resin having good thermal stability and excellent moldability and color shade.

Polyacetal resins, by virtue of their excellent properties, are widely used as engineering plastics in the form of molded parts in various areas of applications. Broadly classified, polyacetal resins are available in the form of homopolymer and copolymer. The former is produced by polymerizing formaldehyde or trioxane in the presence of a catalyst and subsequently stabilized by blocking its ends with chemically stable radicals by acetylation or etherification or urethanization. However, if any part remains unreacted in the stabilization process, it will affect the quality and processability of the product.

The copolymer is produced by copolymerization of trioxane or a similar cyclic acetal, as chief raw material, with a cyclic ether, such as ethylene oxide, or cyclic formal in the presence of a catalyst. Also is known a method wherein a monopolymer is first produced and subsequently a co-monomer other than oxymethylene group is introduced thereinto. Generally, however, these copolymers cannot be put to use as is, because some of their molecular ends remain unstable. It is necessary that such unstable portion be removed.

In the case of the copolymer type as well as in the homopolymer type, the presence of such unstable portion is the source of its drawbacks in quality and processability. For example, when a large number of parts are molded continuously over a long period of time, the presence of such unstable portion results in the accumulation of deposits on the mold surface, which eventually affects the mold release characteristics, external smoothness, and dimensional accuracy of parts produced in the mold. As such, it is often necessary to stop molding operation at short time intervals to clean the mold.

Various proposals have been made to eliminate the unstable portion, but none of them have been found satisfactory. Such difficulty in respect of moldability and more especially that relating to mold deposits are due largely to the presence of an unstable portion in the polyacetal resin. According to research work conducted by the present inventors, however, not only such unstable portion, but also a catalyst residue contained in the polymer and chemically stable polyacetal oligomers of low molecular weight can be causes of accumulation of mold deposits and may adversely affect the moldability of the polymer, including mold release characteristics, product appearance and dimensional accuracy. On the basis of such findings, the present inventors continued their research efforts toward further improvement of polymer quality characteristics, such as thermal stability and moldability, and as a result they arrived at a novel method of treatment which can effectively eliminate aforesaid substances responsible for unsatisfactory molding, such as the unstable portion, low molecular weight oligomer, and catalyst residue.

Accordingly, the present invention provides a method of producing a polyacetal polymer having good stability and good moldability, characterized in that a crude polyacetal polymer obtained by polymerization or copolymerization and having as a principal component thereof, connected oxymethylene radicals in a main chain and including an unstable portion is treated in a non-soluble liquid medium at temperatures higher than 80° C. but lower than the melting point of the polymer and at heterogeneous equilibrium. This contact treatment is carried out by moving the crude polymer and the non-soluble medium in opposite directions relative to each other.

Hitherto it has been known to subject a crude polyacetal copolymer obtained by copolymerization to heat treatment directly in a non-soluble medium and at heterogeneous equilibrium to remove unstable portions therefrom to a certain degree (see Japanese Patent Publication Nos. 10435/1965 and 7553/1968, for example). According to the observations of the present inventors, however, such simple treatment of the polymer in mixture with the medium is not sufficient to decompose and remove any unstable portion. Also, it is undesirable to raise treating temperatures or raise the pH of the treating solution, or to prolong the treating time, in order to further decomposition and removal of such unstable portion, because it will cause the polymer to tend to become discolored.

Accordingly, the present inventors endeavored to overcome these difficulties in the treatment of such polymer with a non-soluble medium and to find a treating method which permits effective removal of unstable portions, low molecular weight oligomers, and catalyst residues and yet causes no discoloration. As a result, it was found that when a crude polymer containing such unstable portion and oligomers is treated with a non-soluble heating medium, it is possible to inhibit discoloration and decompose and remove the unstable portion more effectively by catalytically contact-treating the crude polymer while moving the crude polymer and liquid medium in opposite directions relative to each other, even where the amount of the medium is small and where comparatively severe conditions are prevalent. Thus, this invention was made.

With conventional treatment through simple mixture with a medium, the concentration of formaldehyde and oligomer as decomposed and eluted in the medium tends to increase in proportion as the unstable portion in the polymer is reduced, and accordingly, the effect of unstable content removal is gradually lowered and the formaldehyde in the solution tends to produce a coloring substance, with the result that the polymer, once refined and stabilized, becomes discolored. In contrast to this, where a crude polymer containing an unstable portion is moved in the opposite direction relative to the liquid medium as in the present invention, the polymer comes in contact with a fresh portion of the medium having a lower concentration of formalin or the like as the process of polymer treatment and refinement advances, which fact, it is understood, explains the reason why the method of the present invention overcomes the aforesaid difficulties with the conventional method and assures remarkably effective decomposition and removal of the unstable portion.

The method of the invention will now be explained in detail.

Referring first to crude polyacetal polymers available for use in the method of the invention, any polyacetal polymer obtained by a known method of polymerization may be effectively used. The method of the invention is most effective with copolymers. Typical of such copolymers is one having as principal component thereof a cyclic acetal, such as trioxane or the like and obtained by copolymerizing same with a known co-monomer copolymerizable therewith by using a known catalyst, e.g., a copolymer having two or more connected carbon atoms in a main chain and having a melting point of more than 150° C., as obtained by polymerization of trioxane, a main monomer, with 0.2–10 weight % of a co-monomer containing a cyclic ether or cyclic formal, such as ethylene oxide, dioxalane, 1,4-butanediol formal or the like, in the presence of a catalyst such as boron trifluoride or a complex compound thereof. It is noted that among the copolymers available, are multi-copolymers, or copolymers having a branched or crosslinked molecular structure obtained by copolymerizing a main monomer with a co-monomer plus a third monomer, for example, a multicomponent monomer containing mono- or diglycidyl or another such compound. It is also possible to use the method of the invention with a copolymer obtained by introducing a co-monomer into a separately produced homopolymer.

When applying the method of the invention in treating a crude copolymer obtained by any such copolymerization reaction, it is desirable to crush the copolymer to a suitable granular size, wash with some solution containing a catalyst inactivating agent and then dehydrate to separate and remove a larger part of the unreacted monomers, before such treatment is carried out. It is possible, however, to apply the method of the invention to the polymerization reaction mixture as crushed and still including a small amount of residual monomers.

Not only is the method of the invention effective especially with such crude copolymers as aforesaid, but also it can be effectively applied to a homopolymer having its ends chemically blocked and stabilized, in order to decompose and remove a small unstable polymer portion remaining unreacted for end blocking and remove low molecular weight oligomers or the like present in the polymer to improve the thermal stability and moldability of the polymer. In the case where the method of the invention is to be applied to a homopolymer, it is particularly desirable that the homopolymer should be one having most of its ends blocked by etherification or urethanization and having a hydrolysis-resistant terminal structure.

According to the method of the invention, it is essential that the insoluble liquid medium used be kept in liquid form and at temperatures above 80° C. but below the melting point of the polymer, without dissolving the polymer to any perceivable extent, while the polymer is treated. Therefore, the pressure applied during the treatment may be determined according to the type of liquid used and the temperature applied. At a temperature below 80° C. the speed of unstable content decomposition and removal is low, so that a considerably long period of time is required for treatment. Accordingly, use of such low temperature is undesirable. The polymer is solid and treatment thereof is carried out at heterogeneous equilibrium of solid phase (polymer)-liquid phase (medium). Accordingly, treating temperatures applicable are lower than the melting point of the polymer and most preferably they are above 100° C. and below 150° C. The temperature range may be adjusted by supplying the liquid medium at a predetermined temperature or through heating means, such as a jacket, attached to the treating apparatus.

The liquid medium to be used may be of any type that will not or will only slightly dissolve the polymer at treating temperatures. For example, water or alcohols, ethers, ketones, or mixtures thereof may be used. From the viewpoints of economy, ease of handling, and effectiveness, most suitable among them is water, or an aqueous solution, principally of water. The liquid medium must be substantially neutral or alkaline and must have a pH value of at least 7 or above. Most preferably, it is weakalkaline, being of pH 8–11. In order to maintain the ph of the medium at a suitable value, some suitable alkaline material or buffering agent is usually added to the treating solution as required, before or during treating operation. Among alkaline materials available for the purpose of such addition are hydroxide of ammonia, alkali metal, alkaline earth metal, inorganic or organic salt of weak acid, amines, amidines, and amides. Typical of these materials are ammonium-, sodium-, potassium-, or magnesium-hydroxide, carbonate, phosphate, or carboxylate; mono-, di-, or trialkylamine, or mono-, di-, or tri-alkoxylamine, or cyanoguanidine, or melamine; and their derivatives.

The characteristic feature of the present invention is that when a crude polymer is treated with a liquid medium, this contact treatment is carried out while the polymer and the medium are moved in opposite directions relative to each other, which treatment may be called counter-current treatment. Broadly classified, such treatment may be carried out either on a continuous system or on a batch system. It is also possible to employ both system in combination.

The term "continuous system" referred to herein means a system in which the polymer and the medium constantly move in opposite directions from each other on a continuous basis. A concrete example of this system is described below. A vertically elongate vessel is employed. Crude polymer is continuously supplied into the vessel at its top portion and discharged therefrom at its bottom portion. The rates of supply and discharge are regulated so that crude polymer may normally stay in the vessel for a predetermined period of time, and accordingly the polymer will move sequentially from top to bottom while being kept piling up to a suitable level in the vessel. On the other hand, treating medium is supplied into the vessel at a bottom portion thereof. The medium so supplied is allowed to move from bottom to top while being kept to such a level that polymer granules being kept piling up in the vessel may be constantly immersed in the medium, and is removed from the vessel at a top portion thereof.

Accordingly, the medium keeps on moving while keeping contact with crude polymer granules, whereby the polymer granules moving in the opposite direction relative to the medium will move downward while being treated, until they are completely treated. As the concentration of formaldehyde and oligomer contents eluded into the medium increases with the progress of decomposition of unstable portions in the crude polymer, the medium moves into the upper portion of the vessel in which more unstable polymer portions are present and it is finally discharged from the vessel at the top thereof. Thus, the polymer comes in contact with a cleaner supply of treating solution as the process of its stabilization and refinement progresses, and treatment is effectively carried out without unstable-portion decomposition or oligomer elution being decelerated or stopped. By this arrangement, any polymer once treated can be effectively prevented from being stained or colored by a treating solution which contains a larger proportion of formalin or the like.

In the present embodiment of the system, if the polymer granules to be treated are excessively fine, they may tend to run in the same direction as the medium. By adjusting the granular size of polymer and the flow rate, however, smooth counter-flow treatment can be easily performed without this happening. Even if some very fine granules are present and if they are moved and discharged in conjunction with the medium, they can be ultimately recovered. Wherever a larger proportion of the polymer takes a counter-flow behavior, it has been found, the advantageous effect of the method of the invention is not hindered to any perceivable extent.

The above described example is only exemplary of the continuous counter-current treatment system according to the invention and can be modified in various ways inasmuch as the modification is essentially within the scope of counter-current treatment. For example, with a view to aiding in counter-current flow, some suitable guide plate may be provided in the vessel, or an agitation propelling mechanism may be desirably provided which rotates slowly to prevent dwelling of the polymer. Further, it is noted that the vessel is not limited to a vertically elongate one. A slanted or horizontally extending vessel may be equally effectively employed, only if it permits substantially counter-current movement of larger proportions of the polymer and of the medium. It is of course possible to carry out the required treatment in two or more parts.

Another example of the method of the invention there is a case where counter-current treatment is carried out on a batch basis. In this case, an apparatus consisting of a combination of two or more treating untis is employed. Operation in each of the treating units is nothing but mixing. It must be noted, however, that in a system having two or more units connected together, counter-current treating operation is carried out in which the polymer and the medium are moved in opposite directions relative to each other on a step-by-step basis. For example, three treating units A, B and C are connected one to another and operation is carried out in such a way that untreated crude polymer is supplied to A and moved in the order of A→B→C, whereas treating medium is supplied to C for movement in the order of C→B→A and is discharged from A. Between the individual units A, B and C there is carried out solid-liquid separation so that solid-phase material (polymer) and liquid-phase material are supplied into vessels arranged in opposite directions. For example, in vessel B, the polymer as already treated in vessel A and the medium as already treated in vessel C are supplied and mixed together, and after treatment is made under certain conditions, solid phase-liquid phase separation is carried out so that the polymer is sent to C and the medium is sent to A. Similar process is carried out in A and C, as well. Thus, counter-current treatment can be carried out in all the three stages.

In the case of this example, various modifications may be made. Inasmuch as any such modification is substantially within the concept of step-by-step counter-current treatment, the characteristic feature of the invention can be maintained and the advantageous effect thereof can be assured. In such batch-basis method, even if all the polymer granules are of such fine size as 0.5 mm or below, it is possible to carry out step-by-step counter-current treatment. By using such finely sized granules it is possible to shorten the treating time required. Another advantage of such batch-type method is that it is possible to advantageously use different conditions, for example, in temperature, time, and pH, from stage to stage.

With regard to the quantity of liquid medium to be used in the method of the invention, from the viewpoint of polymer quality, the larger the quantity, the better is the result, but if economical factor is considered, 100–2000 parts by weight, against 100 parts by weight of crude polymer, are suitable, and more preferably 300–1000 parts by weight. In the counter-current treatment according to the invention, as compared with conventional mixing treatment or parallel-flow treatment, it is possible to obtain far more advantageous effect with a much smaller liquid ratio. This can be counted as one of the advantages of the invention.

In the present invention, treating time involved in counter-current treatment differs depending upon the quantity of unstable portion or the like included in the crude polymer to be treated, and treating temperature applied. Generally, however, treating time is 0.5–10 hr, total. It is most desirable to carry out treatment for 1–5 hr.

An analysis of substances contained in liquid fluid in which above described treatment has been carried out, needless to say, proves that there are present formaldehydes resulting from the decomposition and elution of unstable portions. Furthermore, it has been found that there are contained polyacetal oligomers which are chemically stable, but of very low molecular weight. With treated polymers, it is found that their contents of unstable portion, oligomer and polymerization catalyst related substance have been considerably reduced. Polymers dried after treatment were given finish treatment with various stabilizers and other additives, and an evaluation of them proved that they had remarkably improved thermal stability and moldability.

Examples of the present invention are presented below. Needless to say, however, the scope of the invention is not limited by the examples. The following terms and method of measurement as used in the examples and reference examples are understood to refer to the following unless otherwise specified.

1. Unstable portion content of polymer (hereinafter referred to as "unstable content"):

One gram of polymer, put into 100 ml of a 50% aqueous solution of methanol containing 0.5% ammonium hydroxide, is heated and dissolved in a closed vessel at 180° C. for 45 min. Then, the amount of formaldehyde dissolved and eluded into the solution is quantitatively determined. This is presented in terms of wt % relative to the polymer.

2. Loss of weight by heating:

0.5 wt % of 2,2'-methylene-bis(4-methyl-6-t-butyl phenol) and 0.1 wt % of dicyandiamide, as stabilizers, are mixed with the polymer. By using a vented extruder under predetermined conditions the mixture is extruded to form pellet. 5 g of pellet is dried under vacuum, then heated at 230° C. in air for 45 min. The resulting loss of weight is shown in percent.

3. Low-molecular-weight polyacetal oligomer content (hereinafter referred to as "oligomer"):

10 g of pellet, prepared in the same manner as above, is placed in an autoclave. 250 ml of water containing 0.5% ammonium hydroxide is added, the pellet is treated at 150° C. for 3 hr, and then cooled. Solid matter is separated at 100°–80° C. The solution is further cooled to room temperature and is left to stand for more than 24 hr. Suspended solid matter newly separated out in the meantime is shown in terms of wt %. A qualitative analysis of the matter has proved that the matter is a relatively low-molecular-weight polyacetal oligomer which is stable to alkali.

4. Color (b value):

A pellet as prepared in same manner as described above is measured by a differential color meter to determine its b value. The term "b value" refers to a value indicating yellowness. The larger the b value, the greater is the yellowing tendency.

5. Boron-trifluoride polymerization catalyst residue (hereinafter referred to as "catalyst residue"):

Referring to a polymer from a process in which boron-trifluoride polymerization catalyst is used, microanalysis is made to determine the amount of fluorine contained in the polymer. This is presented as ppm of boron trifluoride relative to the polymer.

EXAMPLE

In the following examples (and reference examples) treatment was made using the following two types of crude polymer.

Crude polymer I

A continuous polymerization reactor having mixing, crushing and moving mechanisms was employed. Into the reactor at one end thereof was supplied melted trioxane containing 3.0 wt % of ethylene oxide. At the same location, butyl etherate of boron trifluoride was continuously supplied so that the amount of boron trifluoride as a whole may be 100 ppm relative to the entire monomer content. 80° C. water was passed into the outer jacket of the reactor and continuous polymerization was carried out. Reaction product obtained from the other end of the reactor was passed through the crusher for crushing. The crushed reaction product was washed in an aqueous solution of ammonium hydroxide, and then dehydrated. A crude polyacetal polymer having a residue rate of about 20% was thus obtained.

Post-drying configuration of the crude polymer was as shown in the following table, under the column of Crude Polymer I.

Crude polymer II

Substantially the same process as described above was carried out employing the same polymerization apparatus as above said and using 2.0 wt % of monomer, and a crude polymer having a moisture content of about 20 wt % was obtained. Post-drying configuration of the polymer was as shown in the following table, under the column of Crude Polymer II.

|  | Crude Polymer I | Crude Polymer II |
|---|---|---|
| Unstable content (%) | 2.1 | 4.1 |
| Thermal decomposition rate (%) | 2.3 | 4.5 |
| Oligomer (%) | 0.56 | 0.35 |
| Catalysis residue (ppm) | 86 | 88 |
| Color (b value) | 0.5 | 0.8 |

EXAMPLES 1 AND 2

A heat-retainable cylindrical pressure vessel was employed. Into the vessel at the top thereof were continuously supplied 100 parts by weight/hr of polymer while an agitating shaft provided with a blade having downward moving action was slowly rotated. Polymer was allowed to stay in the cylinder while being kept piling up to a constant level, and was withdrawn at the bottom portion, with a constant retention time maintained as shown in Table 1. Meanwhile, treating medium (as shown in Table 1) was supplied at a constant rate into the vessel at the bottom thereof for movement upward through accumulated polymer granules and was withdrawn at the top of the vessel. Through this arrangement, polymer granules and liquid medium were caused to move in opposite directions from each other, e.g. mutually counter-current-wise, so that the crude polymer was contact-treated with the medium.

The various steady-state treating conditions applied and post-treatment configuration of the polymer were as shown in Table 1.

REF. EXAMPLES 1 AND 2

An agitatable and temperature-adjustable autoclave was employed. Crude polymer was treated with the medium on a one-batch basis. Treating conditions for this purpose were the same as in Examples 1 and 2, except those as to continuous counter-current system or otherwise.

Configuration of the polymer obtained was as shown in Table 1, in comparison with Example 1 and 2.

TABLE 1

|  | Type of crude polymer | Example 1 | Ref. Example 1 | Example 2 | Ref. Example 2 |
|---|---|---|---|---|---|
|  |  | Crude Polymer I | Crude Polymer I | Crude Polymer II | Crude Polymer II |
| Treating conditions | Supply of crude polymer (in dry terms) | 100 (parts by wt/hr) | 100 (parts by wt) | 100 (parts by wt/hr) | 100 (parts by wt) |
|  | Type of medium | Water | Water | Water | Water |
|  | pH of medium supplied | 10.2 | 10.2 | 9.5 | 9.5 |
|  | pH adjuster for medium | Ammonium hydroxide | Ammonium hydroxide | Triethylamine | Triethylamine |
|  | Supply of medium | 700 (parts by wt/hr) | 700 (parts by wt) | 800 (parts by wt/hr) | 800 (parts by wt) |
|  | Treating temperature (°C.) | 130~135 | 130~135 | 135~140 | 135~140 |
|  | Treating time (hr) | 1.0 | 1.0 | 2 | 2 |
| Post-treatment configuration | Unstable content (%) | 0.7 | 1.1 | 0.7 | 1.3 |
|  | Loss of weight by heating (%) | 0.73 | 1.21 | 0.?? | 1.40 |
|  | Oligomer content (%) | 0.12 | 0.18 | 0.08 | 0.14 |
|  | Catalyst residue (ppm) | 34 | 38 | 30 | 38 |
|  | Color (b value) | 1.3 | 2.1 | 1.5 | 3.4 |

EXAMPLES 3 AND 4

Three autoclaves A, B and C, each adapted to allow agitation of polymer flakes in a non-soluble liquid medium and to be temperature-adjusted, were employed. At steady-state, crude polymer was moved in the order of A→B→C for treatment. Meanwhile, treating solution was centrifugally separated after each step of treatment so that it was moved in reverse direction from the polymer, that is, in the order of C→B→A. In this way, a 3-step counter-current batch-system treatment was carried out.

Various treating conditions applied in this case and configuration of treated polymer were as shown in Table 2.

REF. EXAMPLES 3 AND 4

Without applying the above batch-system counter-current treating method, crude polymer was treated by employing one autoclave and under the conditions as Examples 3 and 4. One batch treatment was made over the same length of time as in Examples 3 and 4.

The configuration of this treated polymer was as shown in Table 2.

TABLE 2

| | | Example 3 | Ref. Example 3 | Example 4 | Ref. Example 4 |
|---|---|---|---|---|---|
| | Type of crude Polymer | Crude Polymer I | | Crude Polymer II | |
| Treating conditions | Supply of crude polymer (in dry terms) | 100 (parts by wt/hr) | 100 (parts by wt) | 100 (parts by wt/hr) | 100 (parts by wt) |
| | Type of medium | Water-methanol (wt ratio 60:40) | Water-methanol (wt ratio 60:40) | Water | Water |
| | pH of medium supplied | 9.2 | 9.2 | 9.8 | 9.8 |
| | pH adjuster for medium | Diethylamine | Diethylamine | Triethanolamine | Triethanolamine |
| | Supply of medium | 800 (parts by wt/hr) | 800 (parts by wt) | 1000 (parts by wt/hr) | 1000 (parts by wt) |
| | Treating temperature (°C.) | 105 | 105 | 130 | 130 |
| | Treating time (hr) | 0.5 each in A, B, C, 1.5 in total | 1.5 | 1 each in A, B, C, 3 in total | 3 |
| Post-treatment configuration | Unstable content (%) | 0.7 | 1.3 | 0.7 | 1.5 |
| | Loss of weight by heating (%) | 0.81 | 1.43 | 0.76 | 1.38 |
| | Oligomer content (%) | 0.15 | 0.21 | 0.06 | 0.10 |
| | Catalyst residue (ppm) | 30 | 33 | 25 | 29 |
| | Color (b value) | 1.2 | 1.9 | 1.4 | 3.3 |

Agent: Kaoru Furuya, Patent Attorney

What is claimed is:

1. A method of producing a polyacetal polymer, comprising contacting a crude polyacetal polymer obtained by polymerization or copolymerization and having as a principal component thereof connected oxymethylene radicals in a main chain with a non-soluble liquid medium at temperatures higher than 80° C. but lower than the melting point of the polymer and at heterogeneous equilibrium, by moving the crude polymer and the non-soluble medium in opposite directions relative to each other.

2. The method according to claim 1 wherein the crude polyacetal polymer is a copolymer having an oxyalkylene radical with two or more adjacent carbon stoms in a main chain.

3. The method according to claim 1 or 2 wherein the non-soluble liquid medium is a non-soluble liquid medium which is principally of water.

4. The method according to claim 1 or 2 wherein the non-soluble liquid is a non-soluble liquid medium of which the pH is 7 or above.

5. The method according to claim 3 wherein the non-soluble liquid is a non-soluble liquid medium of which the pH is 7 or above.

* * * * *